(12) United States Patent
Duyvesteyn et al.

(10) Patent No.: US 7,988,847 B2
(45) Date of Patent: Aug. 2, 2011

(54) NOZZLE REACTOR AND METHOD OF USE

(75) Inventors: Willem Duyvesteyn, Reno, NV (US); Gordon R. Wicker, Reno, NV (US)

(73) Assignee: Marathon Oil Canada Corporation, Calgary, Alberta (CA)

( * ) Notice: Subject to any disclaimer, the term of this patent is extended or adjusted under 35 U.S.C. 154(b) by 193 days.

(21) Appl. No.: 12/245,036

(22) Filed: Oct. 3, 2008

(65) Prior Publication Data

US 2009/0090654 A1 Apr. 9, 2009

Related U.S. Application Data

(62) Division of application No. 11/233,385, filed on Sep. 21, 2005, now Pat. No. 7,618,597.

(60) Provisional application No. 60/641,459, filed on Jan. 3, 2005.

(51) Int. Cl.
*C10G 11/20* (2006.01)

(52) U.S. Cl. .................. 208/113; 208/130; 208/132

(58) Field of Classification Search .................. None
See application file for complete search history.

(56) References Cited

U.S. PATENT DOCUMENTS

| | | | |
|---|---|---|---|
| 2,658,861 A | 11/1953 | Pevere et al. | |
| 3,389,075 A | 6/1968 | Addison | |
| 3,565,593 A | 2/1971 | Moore et al. | |
| 3,565,594 A | 2/1971 | Moore | |
| 3,565,968 A * | 2/1971 | Hicks | 585/535 |
| 3,692,859 A | 9/1972 | Cottle | |
| 4,320,091 A | 3/1982 | Irvin | |
| 4,427,537 A * | 1/1984 | Dean et al. | 208/120.01 |
| 4,723,272 A | 2/1988 | Maat | |

(Continued)

FOREIGN PATENT DOCUMENTS

CA 2346181 4/2001

(Continued)

OTHER PUBLICATIONS

Penberthy Houdaille, "Jet Pump Technical Data—Pumping Liquids" pp. 1-11 (1982).

(Continued)

*Primary Examiner* — Tam M Nguyen
(74) *Attorney, Agent, or Firm* — Holland & Hart LLP

(57) ABSTRACT

Embodiments of a nozzle reactor of the type useable to inject a first material feed stock and a second material feed stock to cause interaction between the first material feed stock and second material feed stock are described herein. According to one embodiment, the nozzle reactor includes a reactor body having a reactor body passage with an injection end and an ejection end. The nozzle reactor also includes a first material injector having a first material injection passage and being mounted in the nozzle reactor in material injecting communication with the injection end of the reactor body. The first material injection passage can have an enlarged volume injection section, an enlarged volume ejection section, and a reduced volume mid-section intermediate the enlarged volume injection section and the enlarged volume ejection section. The first material injection passage can also have a material injection end and a material ejection end in injecting communication with the reactor body passage. The nozzle also includes a second material feed port penetrating the reactor body and being adjacent to the material ejection end of the first material injection passage and transverse to a first material injection passage axis extending from the material injection end and material ejection end in the first material injection passage in the first material injector.

6 Claims, 5 Drawing Sheets

U.S. PATENT DOCUMENTS

| | | | |
|---|---|---|---|
| 4,724,272 A | | 2/1988 | Raniere et al. |
| 5,044,552 A | * | 9/1991 | Becker et al. ............... 239/8 |
| 5,108,583 A | * | 4/1992 | Keon ...................... 208/157 |
| 5,254,325 A | | 10/1993 | Yamasaki et al. |
| 5,565,090 A | * | 10/1996 | Gosling et al. ........... 208/134 |
| 5,798,137 A | | 8/1998 | Lord et al. |
| 5,896,435 A | | 4/1999 | Gautier et al. |
| 6,042,717 A | * | 3/2000 | Radcliffe et al. .......... 208/163 |
| 6,352,639 B2 | * | 3/2002 | Ito et al. ................. 208/113 |
| 6,827,786 B2 | | 12/2004 | Lord |
| 6,936,227 B1 | | 8/2005 | De Souza et al. |
| 7,018,435 B1 | | 3/2006 | Wentinck |
| 2002/0035892 A1 | | 3/2002 | Allermand et al. |
| 2002/0081250 A1 | | 6/2002 | Lord |
| 2002/0151604 A1 | | 10/2002 | Detering et al. |
| 2002/0162518 A1 | | 11/2002 | Dumaz et al. |
| 2003/0021746 A1 | * | 1/2003 | Fincke et al. ............. 423/610 |
| 2003/0109758 A1 | | 6/2003 | Gobbel et al. |
| 2004/0065589 A1 | | 4/2004 | Jorgensen |

FOREIGN PATENT DOCUMENTS

| | | |
|---|---|---|
| CA | 2224615 | 7/2001 |

OTHER PUBLICATIONS

International Search Report for PCT/US2005/34092, filed Jul. 26, 2007, 2 pages, dated May 20, 2007.

Written Opinion for PCT/US2005/34092, filed Jul. 26, 2007 7 pages, dated May 20, 2007.

* cited by examiner

NOZZLE REACTOR AND METHOD OF USE

CROSS REFERENCE TO RELATED APPLICATION

This application is a divisional of U.S. application Ser. No. 11/233,385 which claims the benefit of U.S. Provisional Patent Application No. 60/641,459, filed Jan. 3, 2005, which is hereby incorporated herein by reference.

FIELD

This application relates to nozzle reactors, and methods of use, and more Specifically, to nozzle reactors for receipt of material feed stock and injection of the material feed stock and an additional material into a reactor chamber in order cause interaction between the feed stock and additional material within reactor chamber.

BACKGROUND

Nozzle reactors have long been used to inject differing types of materials Into a reactor chamber in the nozzle reactor for the purpose of seeking to cause the materials to interact within the reactor chamber and achieve alteration of the mechanical or chemical composition of one or more of the materials.

One example of a nozzle reactor disclosure is Canadian Patent Application No. 2,224,615 (the '615 Publication). This reference states that its disclosed nozzle reactor is designed to receive a bitumen/steam flow mixture into a single central nozzle reactor passage extending along the axial length of the nozzle reactor. The reference states that the nozzle forms a flow passageway of circular diametric cross-section having the following sections in sequence from the bitumen/steam flow mixture inlet: a first contraction section of reducing diameter for accelerating the flow and reducing the size of bitumen droplets; a diffuser section of expanding diameter to decelerate the flow and induce a shock wave; a second contraction section to accelerate the mixture more than the first contraction section; and an orifice outlet for producing an output jet or spray.

The '615 Publication further states that the disclosed nozzle reactor reduces bitumen droplet size from about 12,000 gm to about 300 pm.

Among other things, the nozzle reactor of the '615 Publication receives a pre-mixed bitumen/steam liquid medium. As a result, the nozzle reactor technique of the '615 Publication requires implementation of one or more substantial pre-mixing steps in order to generate and deliver the desired bitumen/steam liquid medium to the central nozzle reactor passage. In addition, the pre-mixed liquid medium (including bitumen in the mixture) inherently yields limited velocities of the medium through the nozzle reactor.

Another example of a nozzle reactor is shown in FIG. 3 of the enclosed U.S. Patent Application Publication No. 2004/0065589 (the '589 Publication). (See FIG. 4 of the present application). The nozzle reactor discussed in the '589 Publication has two steam injectors disposed: (i) laterally separated from opposing sides of a central, axially extending vapor expansion feed stock injector, (ii) at an acute angle to the axis of the central vapor expansion feed stock injector. The steam injectors are thus disposed for ejection from the steam injectors in the direction of travel of material feed stock injected by the feed stock injector. Each of the three injectors has a discharge end feeding into a central reactor ring or tube extending coaxially from the central feed stock injector. As shown in the '589 Publication, the central feted stock injector appears as if it may have a divergent-to-convergent axial cross-section with a nearly plugged convergent end; but as shown in the enclosed related Canadian Patent Application No. 2,346,181 (the '181 Publication), the central feed stock Injector has a straight-through bore. (See FIG. 5 of the present application).

As the '589 Publication explains, superheated steam is injected through the two laterally opposed steam injectors into the interior of reactor tube in order to impact a pre-heated, centrally-located feed stream of certain types of heavy hydrocarbon simultaneously injected through the vapor expansion feed stock injector into the interior of the reactor tube. (See, e.g., '589 Publication, paragraph 18.) The '589 Publication states that the object of '589 nozzle reactor is to crack the feed stream into lighter hydrocarbons through the impact of the steam feeds with the heavy hydrocarbon feed within the reactor tube. (See, e.g., id., paragraphs 29-31.) According to the '589 Publication, the types of heavy hydrocarbons processed with the '589 nozzle reactor are crude oil, atmospheric residue, and heavy distillates. (Id., paragraph 32.) With the nozzle reactors of either the '589 Publication and the '181 Publication, a central oil feed stock jet intersects the steam jets at some distance from the ejection of these jets from their respective injectors.

The applicants have discovered that, among other things, nozzle reactors Of the type shown in the '589 Publication, the '181 Publication and associated methods of use: (i) are inefficient, (ii) typically sand perhaps always provide only sonic or subsonic velocity of a feed stock into the associated reactor tube; and (iii) yield excessive uncracked or insufficiently cracked heavy hydrocarbons, requiring recycling or other disposition of the resulting un-cracked heavies. These same nozzle reactors also typically yield excessive coke formation and scaling of the nozzle reactor walls, reducing the efficiency of the nozzle reactor and requiring substantial effort to remove the scale formation within the nozzle reactor.

SUMMARY

Disclosed below are representative embodiments that are not intended to be limiting in any way. Instead, the present disclosure is directed toward novel and nonobvious features, aspects, and, equivalents of the embodiments of the nozzle reactor and method of use described below. The disclosed features and aspects of the embodiments can be used alone or in various novel and nonobvious combinations and sub-combinations with one another.

Generally, a nozzle reactor having a variety of aspects and methods of use of a nozzle reactor are described herein. In certain embodiments, the nozzle reactor provides a hydrocarbon cracking nozzle reactor. In certain embodiments, the method includes generating a supersonic jet of material and impacting hydrocarbon material with the supersonic jet.

In one aspect of the nozzle reactor, the reactor may have a material feed injector extending into a reactor chamber section generally transverse to the exit or injection axis of at least one cracking gas or motive material injector. In certain embodiments, at least one cracking gas injector maybe coaxial with the axis of an associated reactor tube and at least one material feed injector may be disposed to inject material feed to impact the cracking gas at the ejection end of the cracking gas injector.

In another aspect, the nozzle reactor may have a cracking gas injector section abutting a central reactor chamber section and a material feed nozzle extending into the reactor chamber section transverse to the axis of the cracking gas injector and adjacent the ejection end of the cracking gas injector. The cracking gas injector nozzle section can have a non-linear injection passage injectingly penetrating the central reactor chamber.

In certain embodiments, the injector passage can have a cross-sectional configuration in which opposing interior passage walls are curved inwardly toward the central axis of the injection passage along the axial length of the injection passage. Preferably, the curved wall of the injection passage has a smooth finish without sharp edges or sudden changes in surface contour, most preferably along the entire axial length of the injection passage. In certain embodiments, the curved wall of the injection passage can provide a nearly or substantially isentropic or frictionless passages for cracking gas passing through the injector section into the central reactor chamber section.

In another aspect, the nozzle reactor may include a material feed injector having at least one or more injection ports, and if desired one or more partially or completely annular injection ports, injectingly abutting the interior of the reactor chamber section. In certain embodiments, a material feed injector can include a material feed injector passage or distribution channel injectingly penetrating at least a substantial portion, or if desired, the entire outer circumferential periphery of an annular injection port. The latter configuration can, in the case of a completely annular injection port for example, provide impact of the material feed stream with the entire circumference of the injected cracking gas stream.

In certain embodiments, a material injection portion or end of the annular material feed port is disposed axially adjacent the gas injector passage end injectingly penetrating the interior of the reactor chamber section. In this fashion, material can be injected through the material feed port radially inwardly toward, and optionally transverse to, an adjacent cracking gas injected through the cracking gas injector nozzle section.

In certain embodiments, the reactor chamber may comprise an annular or other port insert member mounted intermediate a reactor tube and the injector nozzle section. The distal end of the reactor tube, opposite the injector nozzle section, may have an injection passage through which cracking gas and other material may pass. The injection passage may have a frustoconical configuration.

Certain embodiments of the present invention can provide a conical or stepped or telescoped cracking gas and feed material passage, or a combined conical and otherwise shaped material feed passage, extending along the axial length of the interior of the reactor body. The material feed passage may be configured to generally provide interfering, turbulence-inducing contact, optionally limited contact, with a conical or expanding gas jet ejected through the material feed passage by the cracking gas injector. The material feed passage may be provided by the insert member in cooperation with the reactor tube.

In certain embodiments, a first material injection passage of a nozzle of the nozzle reactor includes an insert mounted within the first material injection passage and has a thin-thick-thin cross-section along the axial length of the insert. The insert may have a radially outwardly curved periphery along the axial length of the insert.

Certain embodiments also can provide a method of injecting cracking gas and a feed material into a nozzle reactor. Some embodiments can include injecting cracking gas from a cracking gas injection nozzle into a reaction chamber along the axial length of the reaction chamber and injecting feed material into the reaction chamber transverse to the axis of the reaction chamber. In certain embodiments, the feed material is injected adjacent the end of the cracking gas injection nozzle injectingly abutting the reaction chamber. As a result, the cracking gas impacts the feed material virtually immediately after ejection from the cracking gas injection nozzle. This impact can thus take place before the velocity of the cracking gas may diminish appreciably.

In certain embodiments, cracking or motive gas can comprise superheated steam and the feed material may comprise preheated heavy hydrocarbons. The heavy hydrocarbons may include or consist largely or even essentially of bitumen. Cracking gas also may comprise natural gas, carbon dioxide, or other gases.

In some embodiments, the feed material is injected to impact the cracking gas upon its ejection from the cracking gas injecting nozzle, at an angle of about 90° (rather than at a substantially lower angle with diminished impact between The cracking gas and the feed material as in certain prior art nozzles).

In some embodiments, the bar pressure level of the superheated steam is substantially greater than, and preferably more than double, the pressure level within the 20 reactor chamber or body.

In certain embodiments, the cracking gas is injected through the injection nozzle into the reaction chamber at supersonic speeds. In some embodiments, the cracking gas injection speed is twice the speed of sound or more.

Some embodiments provide reduced back flow and enhanced mechanical shear within the reactor body. Some embodiments may do so and accomplish substantial cracking of a desired hydrocarbon very quickly and generally without substantial regard to retention time of the material feeds within the reactor body.

Certain embodiments of the apparatus and methods provide more efficient Generation and transfer of kinetic energy from a cracking gas to a material feed. Some embodiments may also provide increased material processing capability and output and reduced untracked material or other by-products in the output from the nozzle reactor or retained within the confines of the nozzle reactor, such as reduced scale formation on the side walls of the reactor chamber. Certain embodiments also provide a relatively economical, durable, and easy-to-maintain or repair nozzle reactor.

Some embodiments may provide mechanical cracking of heavy oils or asphaltenes. In certain of these embodiments, the cracking reaction can be caused primarily mechanically by the application of extreme shear rather than by temperature, retention time, or interaction with a catalyst. In some embodiments, the cracking may be selective, such as by selectively cracking primarily only certain heavy hydrocarbons in a hydrocarbon feed stock.

In certain embodiments, cracking gas, cracking gas components, and uses thereof identified above may alternatively or in addition comprise cracking fluid or other motive material, motive material components, and uses thereof respectively.

In certain embodiments, the nozzle reactor can provide not only more selective and efficient cracking of heavy hydrocarbons but also, or alternatively, reduced coke formation and reactor body scaling. In some embodiments, reactor body scaling may even be eliminated.

The foregoing and other features and advantages of the present application will become more apparent from the following detailed description, which proceeds with reference to the accompanying figures.

DETAILED DESCRIPTION

Figure 1:
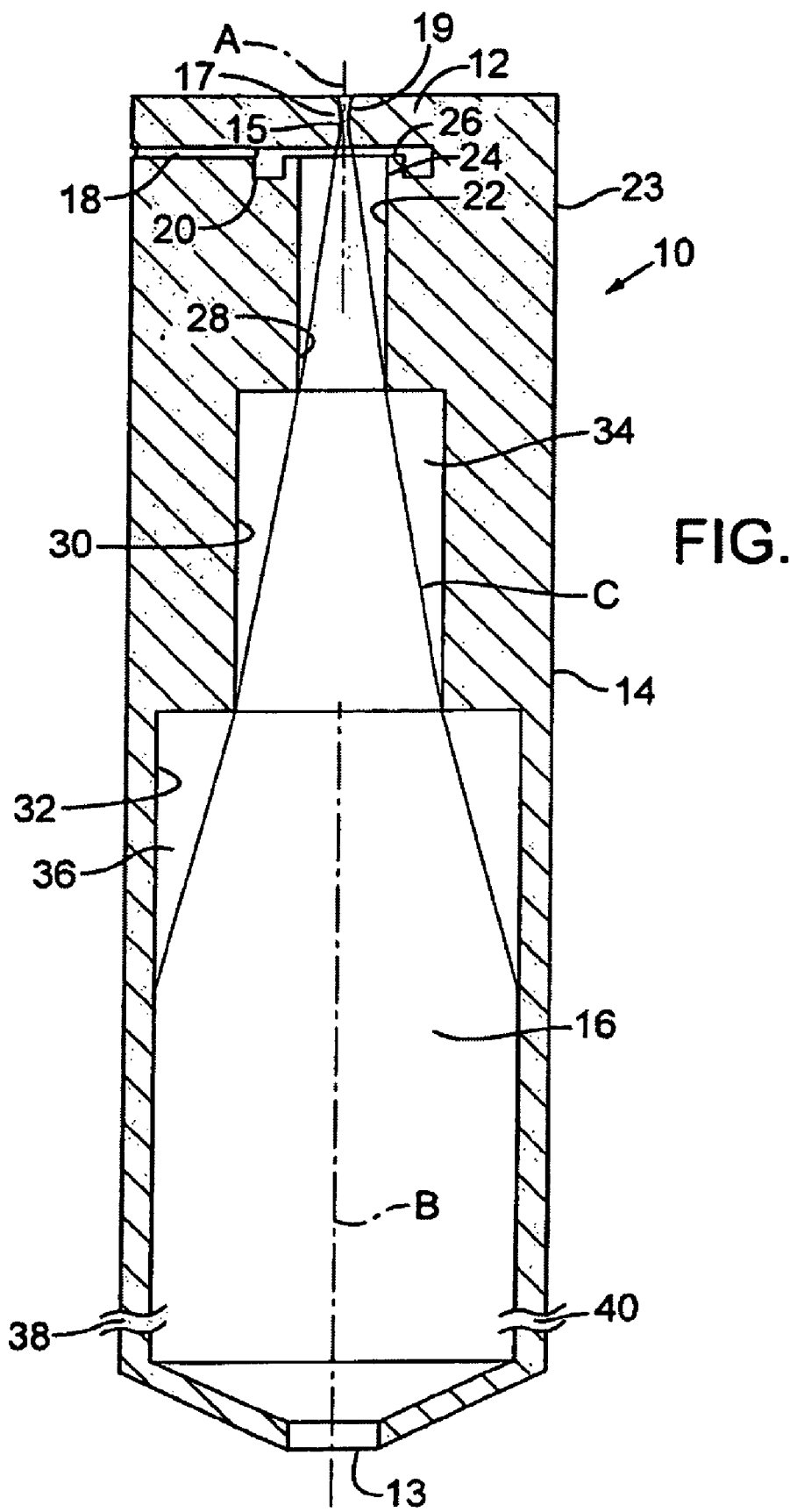
FIG. 1 is a cross-sectional, schematic view of one embodiment of a nozzle reactor.

With reference to FIG. 1, the nozzle reactor, indicated generally at 10, has an injection end 12, a tubular reactor body 14 extending from the injection end 12, and an ejection port 13 in the reactor body 14 opposite its injection end 12. The injection end 12 includes an injection passage 15 extending into the Interior reactor chamber 16 of the reactor body 14. The central axis A of the injection passage 15 is coaxial with the central axis B of the reactor chamber.

With continuing reference to FIG. 1, the injection passage 15 has a Circular diametric cross-section and, as shown in the axially-extending cross-sectional view of FIG. 1, opposing inwardly curved side wall portions 17, 19 (i.e., curved inwardly toward the central axis A of the injection passage 15) extending along the axial length of the injection passage 15. In certain embodiments, the axially inwardly curved side wall portions 17, 19 of the injection passage 15 allow for a higher speed of injection gas when passing through the injection passage 15 into the reactor chamber 16.

In certain embodiments, the side wall of the injection passage 15 can provide one or more among: (i) uniform axial acceleration of gas passing through the injection nozzle passage; (ii) minimal radial accelleration of such gas; (iii) a smooth finish; (iv) absence of sharp edges; and (v) absence of sudden or sharp changes in direction. The side wall configuration can render the injection passage 15 substantially isentropic. These latter types of side wall and injection passage 15 features can be, among other things, particularly useful for pilot plant nozzle reactors of minimal size.

A material feed passage or channel 18 extends from the exterior of the Junction of the injection end 12 and the tubular reactor body 14 toward the reaction chamber 16 transversely to the axis B of the interior reactor chamber 16. The material feed passage 18 penetrates an annular material feed port 20 adjacent the interior reactor chamber wall 22 at the end 24 of the interior reactor chamber 16 abutting the injection end 12. The material feed port 20 includes an annular, radially extending chamber feed slot 26 in material-injecting communication with the interior reactor chamber 16. The material feed port 20 is thus configured to inject feed material: (i) at about a 90° angle to the axis of travel of cracking gas injected from the injection nozzle passage 15; (ii) around the entire circumference of a cracking gas injected through the injection passage 15; and (iii) to impact the entire circumference of the free cracking gas stream virtually Immediately upon its emission from the injection passage 15 into the reactor chamber 16.

The annular material feed port 20 may have a U-shaped or C-shaped cross-section among others. In certain embodiments, the material feed port may be open to the interior reactor chamber 16, with no arms or barrier in the path of fluid flow from the material feed passage 18 toward the interior reactor chamber 16. The junction of the material feed port 20 and material feed passage 18 can have a radiused cross-section.

In alternative embodiments, the material feed passage 18, associated feed port 20, and/or injection passage 15 may have differing orientations and configurations and there can be more than one material feed port and associated structure. Similarly, in certain embodiments the injection passage 15 may be located on or in the side 23 of the reactor chamber 16 (and if desired may include an annular cracking gas port) rather than at the injection end 12 of the reactor chamber 16; and the material feed port 20 may be non-annular and located at the injection end 12 of the reactor chamber 16.

In the embodiment of FIG. 1, the interior reactor chamber 16 can be Bounded by stepped, telescoping tubular side walls 28, 30, 32 extending along the axial length of the reactor body 14. In certain embodiments, the stepped side walls 28, 30, 32 are configured to: (i) allow a free jet of injected motive gas, such as superheated steam, natural gas, carbon dioxide, or other gas, to travel generally along and within the conical jet path C generated by the ejection nozzle passage 15 along the axis 13 of the reactor chamber 16, while (ii) reducing the size or involvement of back flow areas, e.g., 34, 36, outside the conical or expanding jet path C, thereby forcing increased contact between the high speed gas jet stream within the conical jet path C and feed material, such as heavy hydrocarbons, injected through the feed port 20.

As indicated by the drawing gaps 38, 40 in the embodiment of FIG. 1, the tubular reactor body 14 has an axial length (along axis B) that is much greater than its width. In the FIG. 1 embodiment, exemplary length-to-width ratios are typically in the range of 2 to 4 or more.

Figure 2:
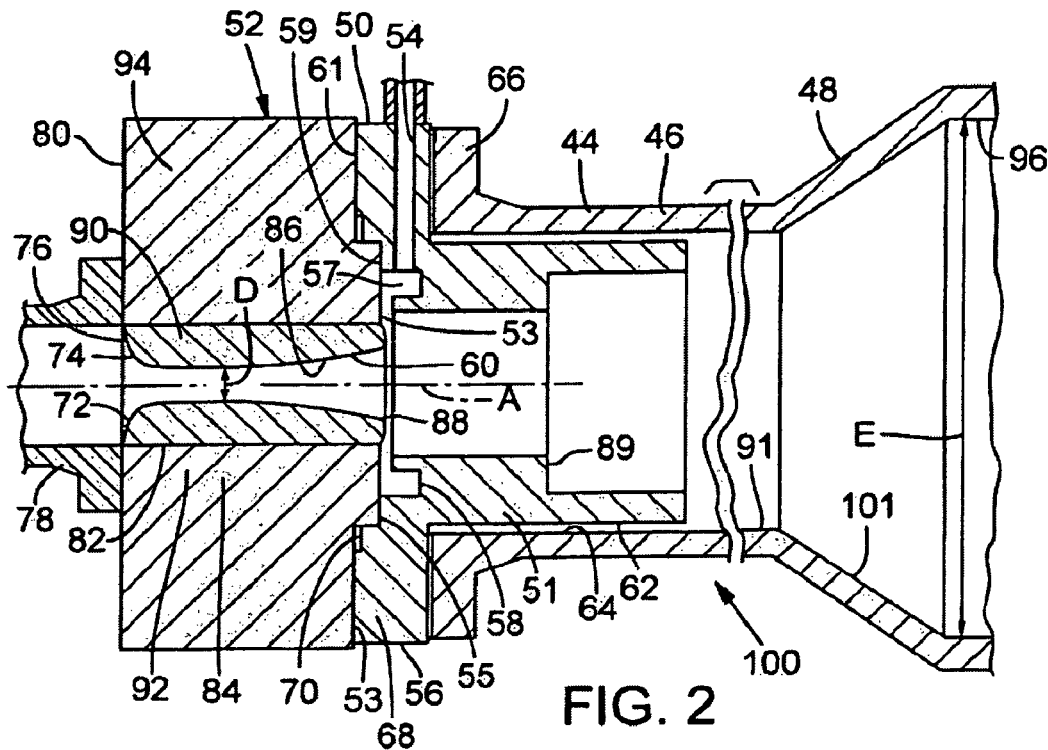
FIG. 2 is a cross-sectional view of the nozzle reactor of FIG. 1, showing further construction details for the nozzle reactor.

With reference now to FIG. 2 and the particular embodiment shown therein, the reactor body 44 includes a generally tubular central section 46 and a frustoconical ejection end 48 extending from the central section 46 opposite an insert end 50 of the central section 46, with the insert end 50 in turn abutting the injection nozzle 52. The insert end 50 of the central section 46 consists of a generally tubular central body 51. The central body 51 has a tubular material feed passage 54 extending from the external periphery 56 of the insert end 50 radially inwardly to injectingly communicate with the annular circumferential feed port depression or channel 58 in the otherwise planar, radially inwardly extending portion 59 of the axially stepped face 61 of the insert, end 50. The inwardly extending portion 59 abuts the planar radially internally extending portion 53 of a matingly stepped face 55 of the injection nozzle 52. The feed port channel 58 and axially opposed radially internally extending portion 53 of the injection nozzle 52 cooperatively provide an annular feed port 57 disposed transversely laterally, or radially outwardly, from the axis A of a preferably non-linear injection passage 60 in the injection nozzle 52.

The tubular body 51 of the insert end SD is secured within and adjacent the interior periphery 64 of the reactor body 44. The mechanism for securing the insert end 50 in this position may consist of an axially-extending nut-and-bolt arrangement (not shown) penetrating co-linearly mating passages (not shown) in: (i) an upper radially extending lip 66 on the reactor body 44; (ii) an abutting, radially outwardly extending thickened neck section 68 on the insert end 50; and (iii) in turn, the abutting injector nozzle 52. Other mechanisms for securing the insert end 50 within the reactor body 44 may include a press fit (not shown) or mating threads (not shown) on the outer periphery 62 of the tubular body 51 and on the inner periphery 64 of the reactor body 44. Seals, e.g., 70, may be mounted as desired between, for example, the radially extending lip 66 and the abutting the neck section 68 and the neck section 68 and the abutting injector nozzle 52.

The non-linear injection passage 60 has, from an axially-extending cross-sectional perspective, mating, radially inwardly curved opposing side wall sections 72, 74 extending along the axial length of the nonlinear injection passage 60. The entry end 76 of injection passage 60 provides a rounded circumferential face abutting an injection feed tube 78, which can be bolted (not shown) to the mating planar, radially outwardly extending distal face 80 on the injection nozzle 52.

In the embodiment of FIG. 2, the nozzle passage 60 a DeLaval type of nozzle and has an axially convergent section 82 abutting an intermediate relatively narrower throat section 84, which in turn abuts an axially divergent section 86. The nozzle passage 60 also has a circular diametric cross-section (i.e., in cross-sectional view perpendicular to the axis of the nozzle passage) all along its axial length. In certain embodiments, the nozzle passage 60 may also present a somewhat roundly curved thick 82, less curved thicker 84, and relatively even less curved and more gently sloped relatively thin 86 axially extending cross-sectional configuration from the entry end 76 to the injection end 88 of the injection passage 66 in the injection nozzle 52.

The nozzle passage 60 can thus be configured to present a substantially Isentropic or frictionless configuration for the injection nozzle 52. This configuration may vary, however, depending on the application involved in order to yield a substantially isentropic configuration for the application.

The injection passage 60 is formed in a replaceable injection nozzle insert 90 press-fit or threaded into a mating injection nozzle mounting passage 92 extending axially through an injection nozzle body 94 of the injection nozzle 52. The injection nozzle insert 90 is preferably made of hardened steel alloy, and the balance of the nozzle reactor 100 components other than seals, if any, are preferably made of steel or stainless steel.

In the particular embodiment shown in FIG. 2, the narrowest diameter D within the injection passage is 140 mm. The diameter E of the ejection passage opening 96 in the ejection end 48 of the reactor body 44 is 2.2 meters. The axial length of the reactor body 44, from the injection end 88 of the injector passage 60 to the ejection passage opening 96, is 10 meters.

The interior peripheries 89, 91 of the insert end 50 and the tubular central section 46, respectively, cooperatively provide a stepped or telescoped structure expanding radially outwardly from the injection end 88 of the injection or injector passage 60 toward the frustoconical end 48 of the reactor body 44. The particular dimensions of the various components, however, will vary based on the particular application for the nozzle reactor, generally 100. Factors taken into account in determining the particular dimensions include the physical properties of the cracking gas (density, enthalpy, entropy, heat capacity, etc.) and the pressure ratio from the entry end 76 to the injection end 88 of the injector passage 60.

The embodiment of FIG. 2 may be used to, for example, crack heavy hydrocarbon material, including bitumen if desired, into lighter hydrocarbons and other components. In order to do so in certain embodiments, superheated steam (not shown) is injected into the injection passage 60. The pressure differential from the entry end 76, where the pressure is relatively high, to the ejection end 88, where the pressure is relatively lower, aids in accelerating the superheated steam through the injection passage 60.

In certain embodiments having one or more non-linear cracking gas injection passages, e.g., 60, such as the convergent/divergent configuration of FIG. 2, the pressure differential can yield a steady increase in the kinetic energy of the cracking gas as it moves along the axial length of the cracking gas injection passage(s) 60. The cracking gas may thereby eject from the ejection end 88 of the injection passage 60 into the interior of the reactor body 44 at supersonic speed with a commensurately relatively high level of kinetic energy. In these embodiments, the level of kinetic energy of the supersonic discharge Cracking gas is therefore greater than can be achieved by certain prior art straight-through injectors or other injectors such as the convergent, divergent, convergent nozzle reactor of the '615 Publication.

Other embodiments of a cracking gas injection passage may not be as isentropic but may provide a substantial increase in the speed and kinetic energy of the cracking gas as it moves through the injection passage 60. For example, an injection passage 60 may comprise a series of conical or toroidal sections (not shown) to provide varying cracking gas acceleration through the passage 60 and, in certain embodiments, supersonic discharge of the cracking gas from the passage 60.

In certain methods of use of the nozzle reactor embodiment illustrated in FIG. 2, heavy hydrocarbon feed stock (not shown) is pre-heated, for example at 2-15 bar, which is generally the same pressure as that in the reactor body 44. In the case of bitumen feed stock, the preheat should provide a feed stock temperature of 300 to 500°, and most advantageously 400 to 450° C. Contemporaneously, the preheated feed stock is injected into the material feed passage 54 and then through the mating annular feed port 57. The feed stock thereby travels radially inwardly to impact a transversely (i.e., axially) traveling high speed cracking gas jet (for example, steam, natural gas, carbon dioxide or other gas not shown) virtually immediately upon its ejection from the ejection end 88 of the injection passage 60. The collision of the radially injected feed stock with the axially traveling high speed steam jet delivers kinetic and thermal energy to the feed stock. The applicants believe that this process may continue, but with diminished intensity and productivity, through the length of the reactor body 44 as injected feed stock is forced along the axis of the reactor body 44 and yet constrained from avoiding contact with the jet stream by the telescoping interior walls, e.g., 89, 91 101, of the reactor body 44. Depending on the nature of the feed stock and its pre-feed treatment, differing results can be procured, such as cracking of heavy hydrocarbons, including bitumen, into lighter hydrocarbons and, if present in the heavy hydrocarbons or injected gas, other materials.

Figure 3:
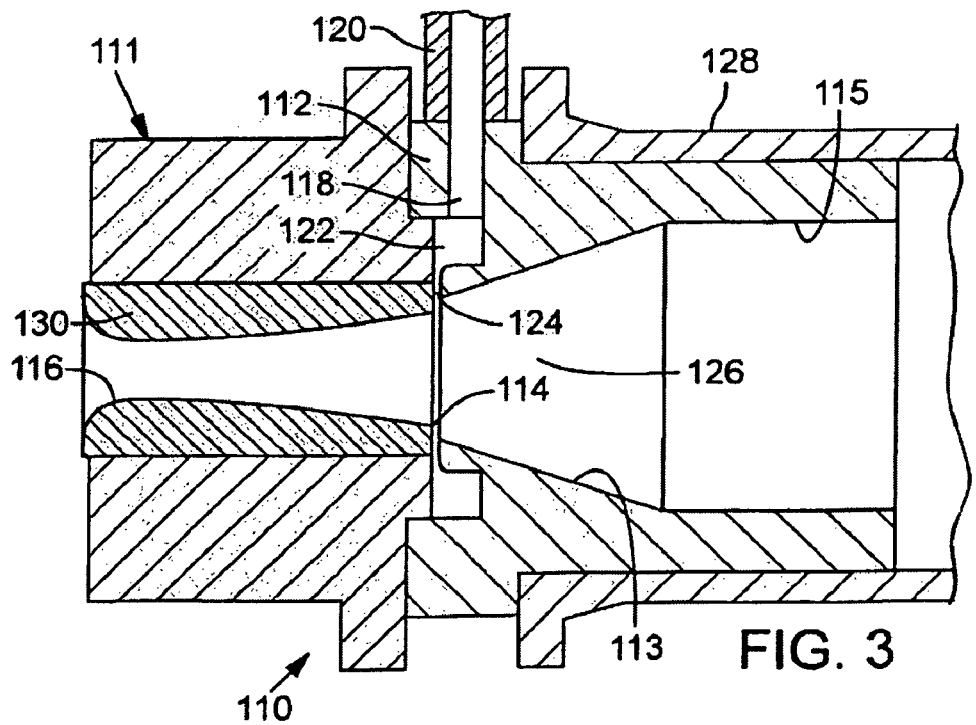
FIG. 3 is a cross-sectional view of an alternative embodiment of a nozzle reactor.

With reference now to FIG. 3, an alternative embodiment of the nozzle reactor, generally 110, has a nozzle 111 and a reactor body 128 with an insert end 112 intermediate the reactor body 128 injector insert 130. The insert end 112 has a conical interior periphery section 113 that: (i) extends, and expands outwardly, from the injection end 114 of the injection passage 116 of the nozzle 111; and (ii) terminates with a maximum diameter at the abutting tubular interior periphery section 115 of the insert end 112 opposite the ejection end 114 of the injection passage 116. This alternative embodiment also has a feed material injection passage 118 formed of a material feed line or tube 120 in communication with an annular material feed distribution channel 122, which in turn is in communication with an axially narrower annular material feed injection ring or port 124. The material feed injection ring 124 is laterally adjacent the ejection end 114 of the injection passage 116 to radially inwardly inject material feed stock, such as bitumen or other hydrocarbons (not shown) for example, into contact with axially injected cracking gas (not shown) virtually immediately upon the ejection of the cracking gas from the ejection end 114 into the interior 126 of the reactor body 128.

The injection passage 116 can be configured to eject a free stream of Cracking gas, such as super-heated steam (not shown) for example, generally conically with an included angle of about 18°. The conical interior section 113 may be configured to surround or interfere with such a free stream of cracking gas ejection stream. In certain such embodiments, after engaging the injected material feed stock adjacent the ejection end 114, the resulting jet mixture—a mixture of cracking gas and material feed stock—preferably makes at least intermittent interrupting contact with the tubular interior section 113 and, if desired, the downstream tubular interior section 115. This intermittent, interrupting contact increases turbulence and concentrates shear stresses into an axially shortened reaction zone within the reactor body 128. Preferably, however, the jet mixture travels through the interior 126 of the reactor body 128 with minimal backflow of any components of the jet mixture, resulting in more rapid plug flow of all jet mixture components through the reactor body 128.

Once the material feed stock is cracked by the cracking gas ejection stream adjacent the injection end 114, the configuration of the reactor body facilitates substantially immediate cooling of the jet mixture. This cooling of the jet mixture acts to arrest the chemical reaction between the material feed stock and the cracking gas ejection stream.

The applicants believe that, in certain embodiments, sufficient steam cracking of at least certain heavy hydrocarbons may be achieved at jet velocities above about 300 meters per second while the retention time in the reactor body zone providing such extreme shear can be very short, on the order of only about 0.01 second. In such embodiments, cracking of material feed stock, such as bitumen for example, can be caused by extreme shear of the cracking gas. In certain of these types of embodiments, the retention time of the material feed or cracking gas in the reactor body 128 therefore can have little or no impact on such cracking or, if desired, any other substantial cracking.

In some embodiments, a catalyst can be introduced into the nozzle reactor to enhance cracking of the material feed stock by the cracking gas ejection stream.

In the applicant's view, the methodology of nozzles of the type shown in the illustrated embodiments, to inject a cracking gas such as steam, can be based on the following equation $$KE = H_0 - H_1 = -\Delta h \qquad (1)$$

where KE is the kinetic energy of the cracking material (referred to as the free jet) immediately upon emission from an injection nozzle $H_0$ is the enthalpy of cracking material upon entry into the injection nozzle, and $H_1$ is the enthalpy of cracking material upon emission from the injection nozzle.

This equation derives from the first law of thermodynamics—that regarding the conservation of energy—in which the types of energy to be considered include: potential energy, kinetic energy, chemical energy, thermal energy, and work energy. In the case of the use of the nozzles of the illustrated embodiments to inject steam, the only significantly pertinent types of energy are kinetic energy and thermal energy. The others—potential, chemical, and work energy—can be zero or low enough to be disregarded. Also, the inlet kinetic energy can be low enough to be disregarded. Thus, the resulting kinetic energy of the cracking material is as set forth in the above equation.

The second law of thermodynamics—that the entropy of a system cannot increase—means that no real process is perfectly isentropic. However, a practically isentropic nozzle (i.e., a nozzle commonly referred to as "isentropic" in the art) is one in which the increase in entropy through the nozzle results in a relatively complete or very high conversion of thermal energy into kinetic energy. On the other hand, non-isentropic nozzles such as a straight-bore nozzle not only result in much less efficiency in conversion of thermal energy into kinetic energy but also can impose upper limits on the amount of kinetic energy available from them.

For example, since the velocity of an ideal gas through a nozzle is Represented by the equation $$V = (-2\Delta H)^{1/2} \qquad (2)$$

and the velocity in a straight-bore nozzle is limited to the speed of sound, the kinetic energy of a gas jet delivered by a straight bore nozzle is limited. However, a practically "isentropic" converging/diverging nozzle, such as shown In FIGS. 1-3 and 6-9, can yield, i.e., eject, a gas jet that is supersonic. Consequently, the kinetic energy of the gas jet delivered by such an isentropic converging/diverging nozzle can be substantially greater than that of the straight-bore nozzle, such as that shown in the '181 Publication.

It can thus be seen that certain embodiments disclosed above can provide a nozzle reactor providing enhanced transfer of kinetic energy to the material feed stock through many aspects such as, for example, by providing a supersonic cracking gas jet, improved orientation of the direction of flow of a cracking gas (or cracking gas mixture) with respect to that of the feed stock, and/or more complete cracking gas stream impact with the material feed stock as a result of, for example, an annular material feed port and the telescoped reactor body interior. Certain embodiments also can result in reduced retention of by-products, such as coking, on the side walls of the reactor chamber. Embodiments of the nozzle reactor can also be relatively rapid in operation, efficient, reliable, easy to maintain and repair, and relatively economical to make and use.

It should be noted that, in certain embodiments including in conjunction with the embodiment's shown in FIGS. 1-3 above, the injection material may comprise a cracking fluid or other motive material rather than, or in addition to, a cracking gas. Accordingly, it is to be understood that certain embodiments may utilize components that comprise motive material compatible components rather than, as described in particular embodiments above, cracking gas compatible components such as, for example, the cracking gas injection passage, e.g., 60, referenced above. When utilized in conjunction with an inwardly narrowed motive material injection passage, however, the motive material preferably is compressible.

Figures 4, 5:
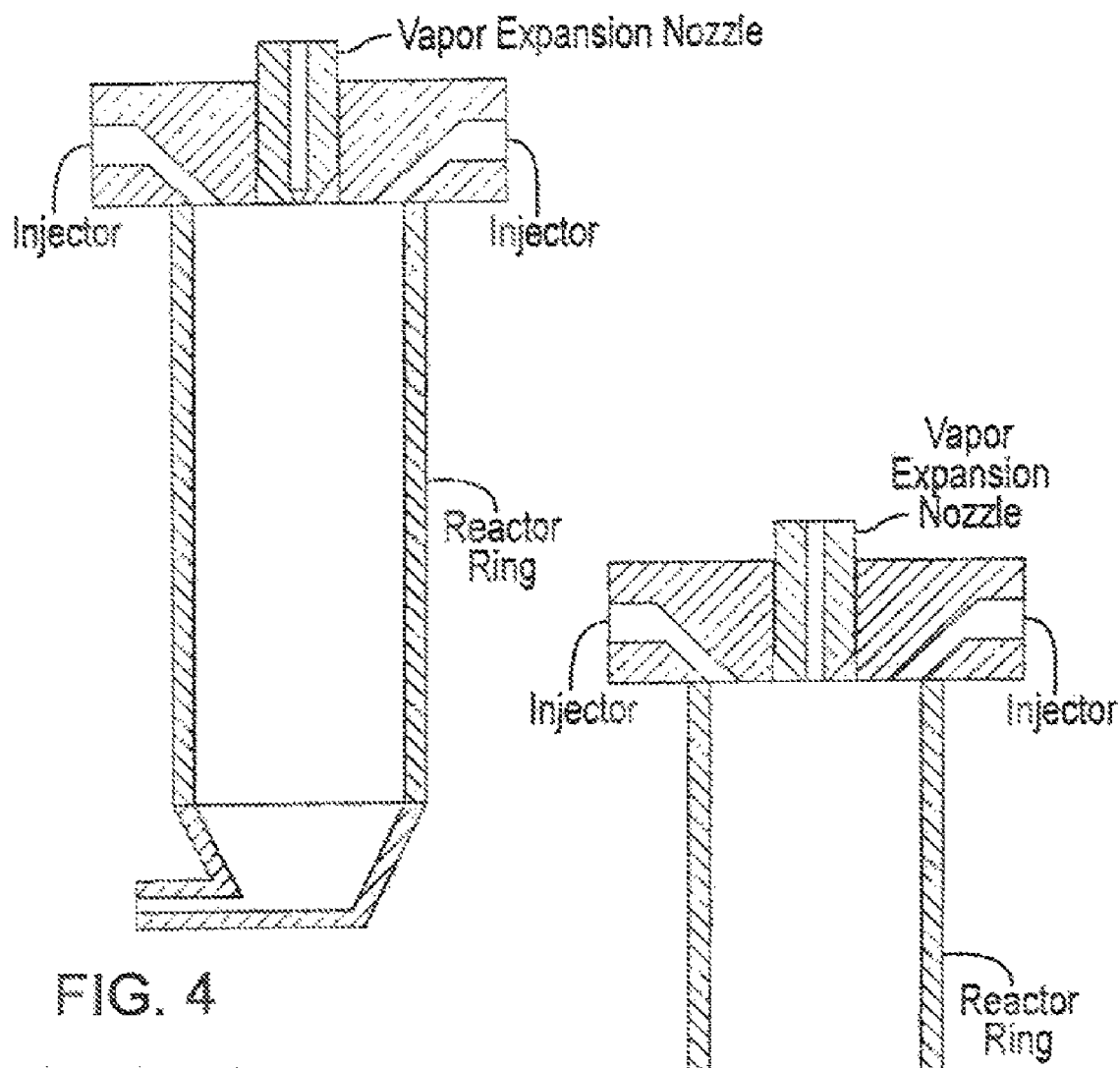
FIG. 4 is the nozzle reactor shown in FIG. 3 of the '589 Publication.
FIG. 5 is the nozzle reactor shown in FIG. 3 of the '181 Publication.

The applicants believe that a non-linear nozzle reactor embodiment (as generally shown in FIG. 1) and a linear injector nozzle reactor one inch in axial length (configured as generally shown in FIG. 4) provide the following theoretical results for 30 bar steam feed stock supplied at 660° C. with interior reactor body pressures of 10 bar and 3 bar as shown. For both of these types of nozzles, however, the nozzle configurations must be changed (by varying the position of the throat 84 and the diameter of the discharge or injection end 88) in order to deliver 2 barrels per day (water volume) of steam at 10 bars and 3 bars. The results listed in Table 1 are based on the assumption of perfect gas behavior and the use of k ($C_p/C_v$ ratio of specific heats).

TABLE 1

|  | Straight-Through Injector Nozzle reactor | | Convergent/Divergent Injection Nozzle reactor | |
| --- | --- | --- | --- | --- |
|  | 10 bar | 3 bar | 10 bar | 3 bar |
| Throat Diameter, mm | 1.60 | 2.80 | 1.20 | 1.20 |
| Steam Temp., ° C. | 560.0 | 544.3 | 464.4 | 296.7 |
| Stream Velocity, m/s | 647.1 | 690.0 | 914.1 | 1244.1 |
| Mach Number | 0.93 | 1.00 | 1.39 | 2.12 |
| Kinetic energy, kW | 0.72 | 1.12 | 1.43 | 2.64 |

As can be seen from the results of applicants' calculations above, the theoretically tested straight-through injection nozzles of the prior art theoretically provide steam jet velocity at, or less than, the speed of sound. In contrast, the theoretically tested convergent/divergent injection nozzles of the present application theoretically can provide a steam jet velocity in the reactor body well in excess of the speed of sound and, at 3 bar interior reactor body pressure, in excess of twice the speed of sound. Similarly and as a result, the associated kinetic energies of steam jets of the convergent/divergent injection nozzles are theoretically significantly greater than the associated kinetic energies of the steam jets of the linear injection nozzles.

The applicants therefore believe that the theoretically tested convergent/divergent injection nozzles of the present application, such as nozzle 111 of FIG. 3, are significantly more isentropic than the theoretically tested straight-through nozzle. As shown by the theoretical kinetic energy data above, the applicants also believe that the theoretically tested convergent/divergent injection nozzles can be 2 to 2.5 times more efficient than the theoretically tested straight-through nozzles identified above. The above theoretical results were obtained using steam as the cracking gas and therefore, are based on thermodynamic properties of steam. However, similar theoretical results can be obtained using other gaseous motive fluids as the cracking gas.

Similarly, the kinetic energies of cracking gas jet of the convergent/divergent injection nozzles can also be significantly greater than the associated kinetic energies of the medium of the convergent/divergent/convergent nozzle of the type disclosed in the '615 Publication.

In the convergent/divergent/convergent nozzle of the '615 Publication, however, the velocity and kinetic energy of the bitumen/steam medium is designed to substantially decrease at least via the second convergent section, thus diminishing the ultimate velocity and kinetic energy of the medium when ejected from the '615 Publication's nozzle reactor. In addition, the '615 Publication's use of a mixed bitumen/steam medium itself reduces the velocity of The medium as compared to the velocities, and resulting shear, attainable by injection of separate steam and pre-heated bitumen feeds, for example.

Figure 6:
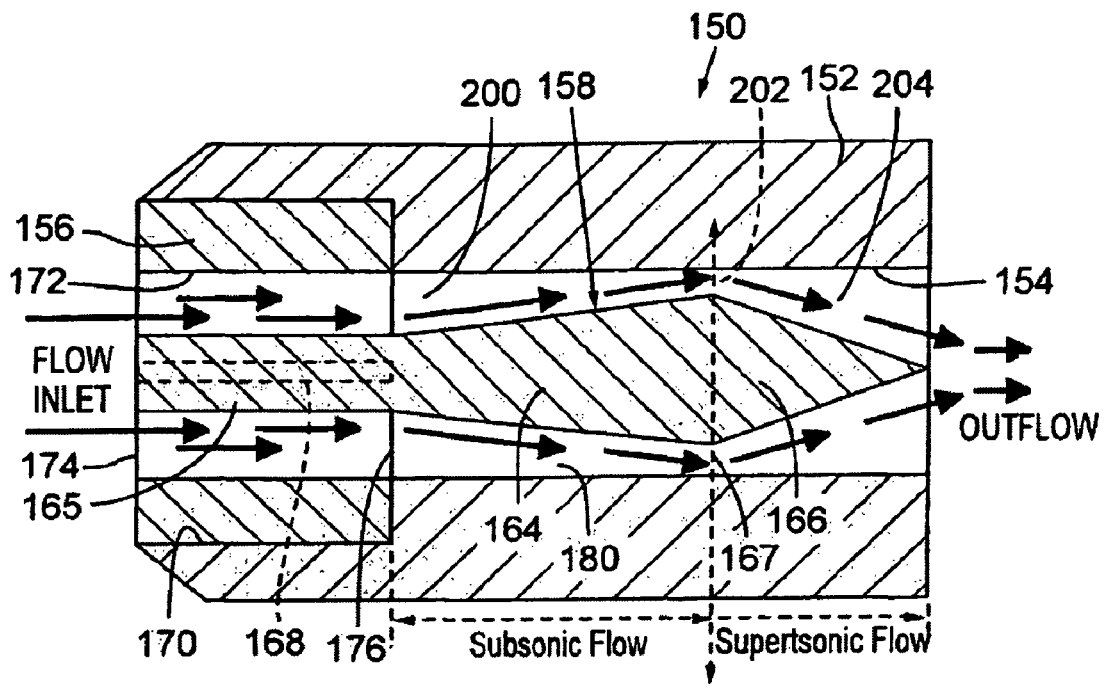
FIG. 6 is a cross-sectional, schematic view of one embodiment of an injection nozzle for use with a nozzle reactor.
Figure 7:
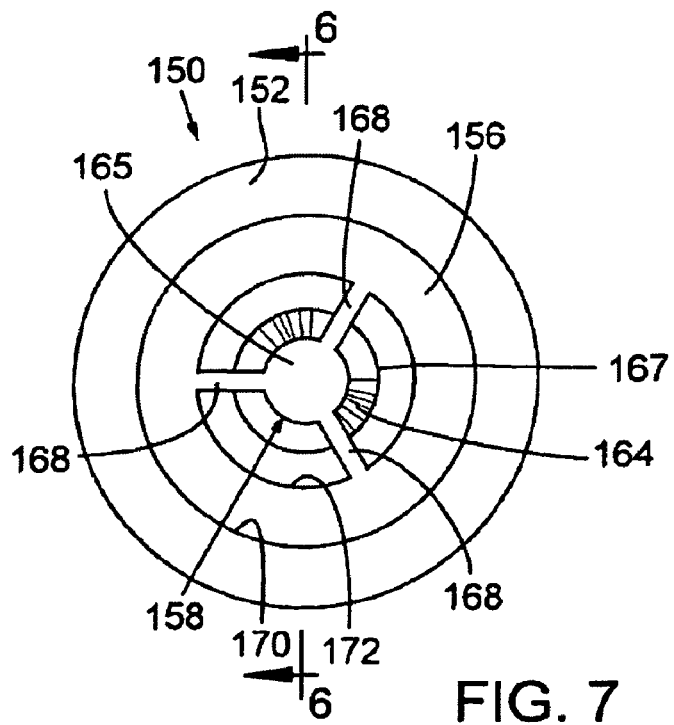
FIG. 7 is an end view of the injection nozzle of FIG. 6 taken from the inlet 10 end of the nozzle.

In some embodiments, a nozzle reactor of the present application can include an injection nozzle that has a flow directing insert around which a first material can flow to increase the velocity of the first material in preparation for an interaction with a second material to alter the mechanical or chemical composition of the first and/or second materials. For example, as shown in FIGS. 6 and 7, an injection nozzle 150 includes an injection nozzle body 152 having an injection passage 154 extending axially through the body. In certain implementations, the passage 154 has a constant diameter along the axial length of the passage. In other implementations, the diameter of the passage 154 varies, such as decreasing along the axial length of the passage, i.e., narrowing of the passage, or increasing along the axial length of the passage, i.e., widening of the passage, or various combinations of both. A flow directing insert 166 is positioned within the injection passage 154, but remains out of direct contact with the inner surface of the injection passage through use of a supporting insert 156. The flow directing insert 166 can be coupled to the supporting insert 156, which is inserted and secured within a mating supporting insert recess 170 formed in the injection nozzle body 152.

The supporting insert 156 can include one or more support rods 168 connected to a cylindrical portion 165 of the flow directing insert 166. The cylindrical portion 165 includes outer peripheral surfaces that run parallel to the axis of the insert 156. The supporting insert 156 comprises a generally annular shaped fluid flow passage 172 corresponding to the injection passage 154 of the injection nozzle body 152 such that when inserted in the recess 170, the interior periphery of the passage 172 is generally flush with the interior periphery of passage 154. Cross-sectional areas of the fluid flow passage 172 on planes perpendicular to the axis of the fluid flow passage 172 remain substantially the same extending the axial length of the passage 172. In other words, an outer diameter and inner diameter of the fluid flow passage 172 remain generally unchanged throughout the passage.

In some implementations, the inserts 156, 158 are replaceable. In specific implementations, the insert 156, with insert 158 secured thereto, can include external threads and can be removably secured within the mating supporting insert recess 170 by threadably engaging internal threads formed in the recess. In other specific implementations, the insert 158 is press-fit into the recess 170. Yet in other implementations, the insert 156 is bonded to the recess 170 by applying a bonding material, such as a heat-activated adhesive, pressure-activated adhesive, pressure-activated adhesive, or other similar adhesive, between the outer periphery of the insert and the recess, and activating the bonding material.

Fluid, such as cracking gas, is allowed to flow through the nozzle 150 by first passing through a flow inlet opening 174 in the supporting insert 156, the fluid flow passage 172 and a flow outlet opening 176 in the supporting insert. As shown in FIG. 6, the fluid flows around the cylindrical portion 165 and the support rods 168 as it flows through the fluid flow passage 172 at a generally constant velocity. Preferably, the number and cross-sectional area of the support rods 168 are minimized so as not to substantially disrupt the flow of fluid through the fluid flow passage 172.

When the flow directing insert is positioned within the injection passage 154, a generally annular fluid flow passage 180, defined between the surface of The injection passage and the exterior surface of the flow directing insert 158, is formed.

The flow directing insert 158 comprises a diverging, or expanding, portion 164, a converging, or contracting, portion 166 and a transitioning portion 167 coupling the diverging and converging portions. In the illustrated embodiments, the diverging and converging portions 164, 166 are generally frustoconically shaped and conically shaped, respectively, with abutting base surfaces proximate the transitioning portion 167. The diameter of the diverging portion increases and the diameter of the converging portion decreases long the axial length of the flow directing insert 158 in the fluid flow direction as indicated in FIG. 6. Accordingly, the annular fluid flow passage 180 between the diverging portion 164 of the flow directing insert 158 and the outer periphery of the injection passage 154, i.e., converging region 200, narrows in the fluid flow direction and the annular fluid flow passage between the converging portion 166 of the flow direction insert and the outer periphery of the injection passage, i.e., diverging region 204, widens in the fluid flow direction. As can be recognized, the annular fluid flow passage 180 is most narrow between the transition portion 167 of the insert 158 and the outer periphery of the injection passage 154, i.e., transition, or throat, region 202.

Fluid flowing through the fluid flow passage 172 in the supporting insert 156 exits through the outlet opening 176 of the passage 172 and into the annular fluid flow passage 180. The nozzle can be configured such that fluid flowing through the fluid flow passage 172 and into the annular fluid flow passage 180 flows at a velocity less than the speed of sound, i.e., subsonic flow. As the fluid flows through the fluid flow passage 180, the narrowing of the converging region and the widening of the diverging region help to induce a back pressure, i.e., pressure is higher at the entry of the passage 180 than at the exit of the passage, which increases the velocity of the fluid. The fluid velocity can be increased such that as the fluid exits the transition region its velocity is at or above the speed of sound, i.e., supersonic flow. The fluid remains at supersonic flow through the diverging region and as it exits the nozzle 150 at the end of the diverging region.

Like the nozzle end 12 of FIG. 1, the injection nozzle 52 of FIG. 2 and the reactor body injection insert 130 of FIG. 3, the nozzle 150 can be coupled to a reactor chamber. Further, the fluid flowing through the nozzle can be a cracking gas that, upon exiting from the nozzle, immediately contacts radially inwardly injected material feed stock proximate the nozzle exit to induce interaction between the cracking gas and the material feed.

Figure 8:
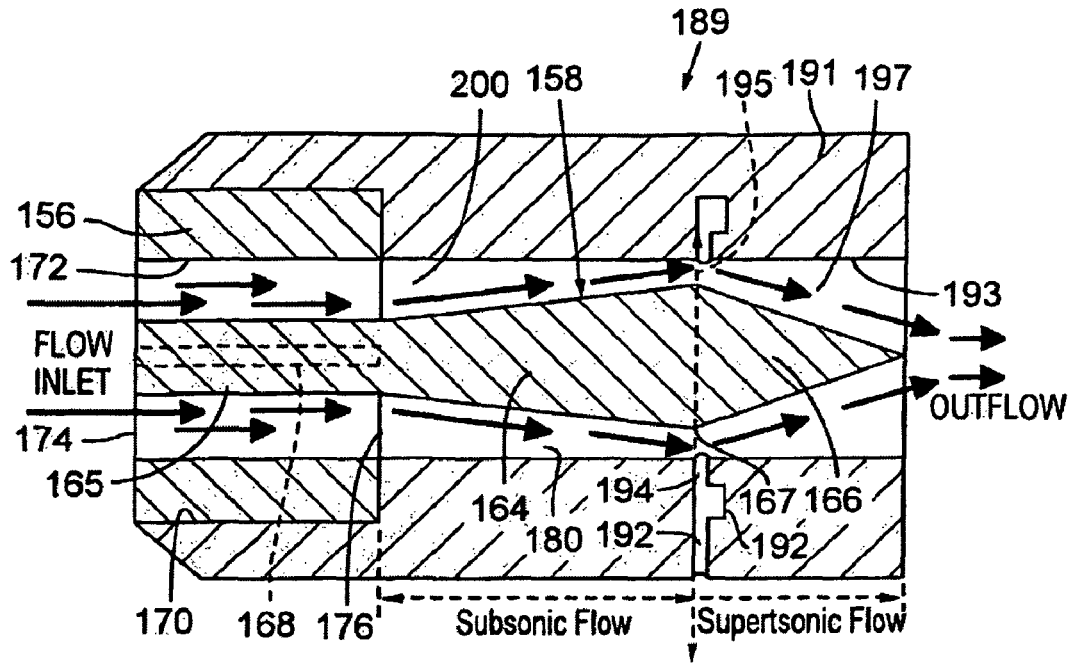
FIG. 8 is a cross-sectional, schematic view of one embodiment of an injection nozzle for use with a nozzle reactor, with the nozzle having a material feed injection passage formed in the nozzle body.

Alternatively, as shown in FIG. 8, a feed material injection passage 190 that extends from an exterior of injection nozzle body 191 toward the injection passage 193. The material feed injection passage 190 penetrates an annular material feed port 192 adjacent the outer periphery of the injection passage 193 proximate transition region 195. The annular material feed port 192 includes an annular, radially extending chamber feed slot 194 in material-injecting communication with an exit of the transition region 195. Similar to FIG. 1, the feed port 192 is configured to inject feed material: (i) at about a 90° angle to the axis of travel of cracking gas flowing through the transition region 195; (ii) around the entire circumference of cracking gas flowing out of the transition region; and (iii) to impact the entire circumference of the free cracking gas virtually immediately upon its emission from the transition region into diverging region 197.

Figure 9:
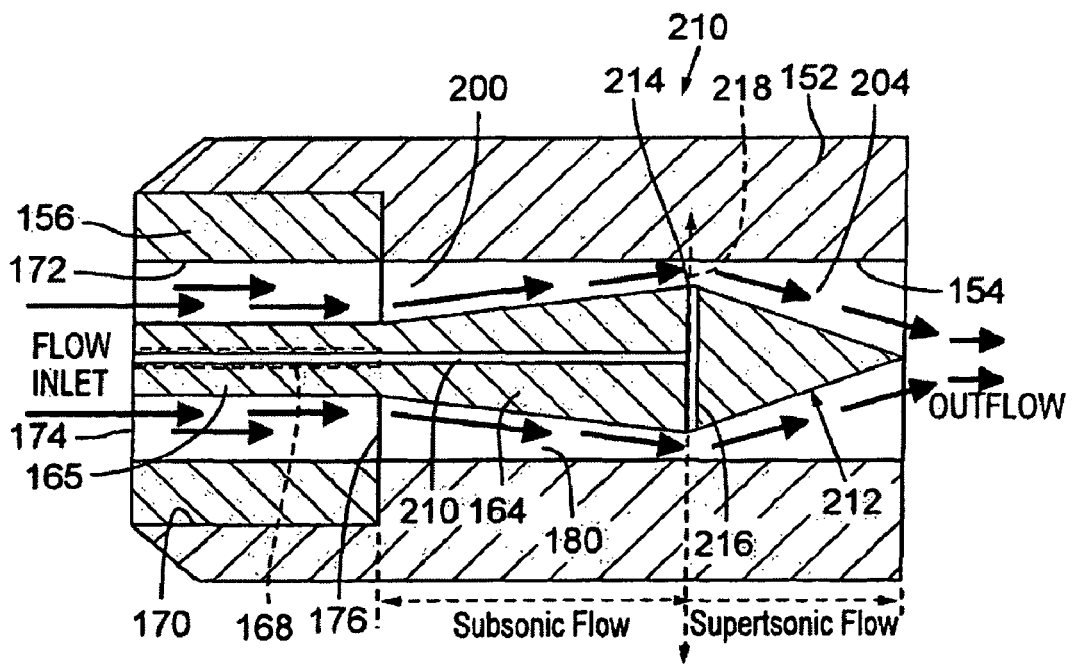
FIG. 9 is a cross-sectional, schematic view of one embodiment of an injection nozzles for use with a nozzle reactor, with the nozzle having a material feed injection passage formed in the flow directing insert.

Now referring to FIG. 9, nozzle 210 is similar to the nozzle 150 of FIGS. 6 and 7 and nozzle 189 of FIG. 8, except that feed material injection passage 210 is formed in the flow directing insert 212 and axially extends from an end of the flow directing insert toward a transitioning portion 214 of the insert. The injection passage 210 penetrates .a disk-shaped feed slot 216 in material-injecting communication with an exit of a transition region 218. Feed material can be injected through the passage 210 through the feed slot 216 and around the entire circumference of cracking gas flowing out of the transition region 218 at a 90° angle to the axis of travel of fluid, e.g., cracking gas, flowing through the transition region. The feed material then impacts the entire circumference of the fluid as described above.

Certain embodiments of the present reactor nozzle and method of use can therefore accomplish cracking of bitumen and other feed stocks primarily, or at least more substantially, by mechanical shear at a molecular level rather than by temperature retention time, or involvement of catalysts. Although such cracking of the hydrocarbon molecules yields smaller, charge imbalanced hydrocarbon chains which subsequently satisfy their charge imbalance by chemical interaction with other materials in the mixed jet stream or otherwise, the driving force of the hydrocarbon cracking process can be mechanical rather than chemical.

In addition, certain embodiments can utilize the greater susceptibility of at least certain heavy hydrocarbons to mechanical cracking in order to selectively crack particular hydrocarbons (such as relatively heavy bitumen for example) as opposed to other lighter hydrocarbons or other materials that may be in the feed stock material as it passes through the nozzle reactor.

Also, in certain embodiments, the configuration of the nozzle reactor can Reduce and even virtually eliminate back mixing while enhancing, for example, plug flow of the cracking gas and material feed mixture through the reactor body and cooling of the mixture through the reactor body. This can aid in not only enhancing mechanical cracking of the material feed but also in reducing coke formation and wall scaling within the reactor body. In combination with injection of a high velocity cracking gas or other motive material from the injection nozzle into the reactor body, coke formation and wall scaling can be even more significantly reduced if not virtually or practically eliminated. In these embodiments, the nozzle reactor can thus provide more efficient and complete cracking, and if desired selective cracking, of heavy hydrocarbons, while reducing and in certain embodiments virtually eliminating wall scaling within the reactor body.

In view of the many possible embodiments to which the principles of the Disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A feed material cracking method comprising:
   A. injecting a stream of cracking material through a converging then diverging passage of a cracking material injector into a reaction chamber, wherein passing the cracking material through the converging then diverging passage accelerates the cracking material to supersonic speed; and
   B. injecting a feed material into the reaction chamber adjacent to the cracking material injector and transverse to the stream of cracking material entering the reaction chamber from the cracking material injector and cracking the feed material at least proximate the intersection of the cracking material and the feed material.

2. The feed material cracking method of claim 1 wherein the feed material injecting step includes injecting the feed material into the reaction chamber annularly around the stream of cracking material.

3. The feed material cracking method of claim 1 wherein the cracking material is a cracking gas.

4. The feed material cracking method of claim 1 wherein the feed material comprises hydrocarbon material.

5. The feed material cracking method of claim 1 wherein the feed material comprises bitumen.

6. The feed material cracking method of claim 3 wherein the feed material comprises bitumen and the cracking gas comprises steam.

* * * * *